(12) United States Patent
Reed

(10) Patent No.: US 9,925,487 B1
(45) Date of Patent: Mar. 27, 2018

(54) FILTER SYSTEM

(71) Applicant: Christopher Sandburg Reed, Crosby, TX (US)

(72) Inventor: Christopher Sandburg Reed, Crosby, TX (US)

(*) Notice: Subject to any disclaimer, the term of this patent is extended or adjusted under 35 U.S.C. 154(b) by 56 days.

(21) Appl. No.: 14/887,775

(22) Filed: Oct. 20, 2015

(51) Int. Cl.
| | |
|---|---|
| *B01D 46/00* | (2006.01) |
| *B01D 46/42* | (2006.01) |
| *B01D 46/02* | (2006.01) |
| *B01D 46/10* | (2006.01) |
| *B65G 15/00* | (2006.01) |
| *B65D 88/30* | (2006.01) |
| *B65D 90/10* | (2006.01) |

(52) U.S. Cl.
CPC ......... *B01D 46/02* (2013.01); *B01D 46/0005* (2013.01); *B65D 90/10* (2013.01)

(58) Field of Classification Search
CPC ........ B01D 46/00; B01D 46/42; B01D 46/02; B01D 46/10; B65D 88/17; B65D 88/30; B65G 15/00
USPC ........ 55/356, 341.1, 366, 378, 385.1, 385.3, 55/429, 467, 508, 374, DIG. 18, DIG. 29; 105/377.05; 277/644, 648
See application file for complete search history.

(56) References Cited

U.S. PATENT DOCUMENTS

| | | | |
|---|---|---|---|
| 3,538,686 A | 11/1970 | Schwab | |
| 4,304,579 A | 12/1981 | Granville | |
| 4,545,833 A | 10/1985 | Tafara | |
| 6,875,248 B1* | 4/2005 | Shelton | B01D 46/002 55/341.1 |
| 8,110,025 B1* | 2/2012 | Schwaiger | B01D 45/08 55/337 |
| 2001/0044986 A1* | 11/2001 | Wilkins | B65D 90/10 16/325 |
| 2005/0091946 A1* | 5/2005 | Cheng | A47L 5/38 55/356 |
| 2005/0126136 A1* | 6/2005 | Cheng | A47L 5/38 55/341.2 |
| 2006/0107631 A1* | 5/2006 | Cheng | A47L 5/365 55/378 |
| 2006/0137312 A1* | 6/2006 | Cheng | A47L 9/1427 55/378 |
| 2009/0025348 A1* | 1/2009 | Cheng | B01D 45/02 55/385.1 |
| 2010/0229512 A1* | 9/2010 | Howard | B01D 46/02 55/373 |
| 2011/0107940 A1* | 5/2011 | Borowski | B61D 5/08 105/377.05 |
| 2016/0059168 A1* | 3/2016 | Bataille | B65D 88/30 414/403 |

* cited by examiner

*Primary Examiner* — Christopher P Jones
*Assistant Examiner* — Minh-Chau Pham
(74) *Attorney, Agent, or Firm* — Mark H. Plager

(57) ABSTRACT

A filter system is configured to filter a particulate matter from air blown from a liquid storage tank having a manway neck. The filter system includes a filter bag, configured to filter the particulate matter from the air. A flange plate is operatively connected to the filter bag and the manway neck. The air blown from the liquid storage tank through the manway neck is filtered by the filter bag.

3 Claims, 5 Drawing Sheets

US 9,925,487 B1

FILTER SYSTEM

BACKGROUND

The embodiments herein relate generally to systems to vent liquid storage tanks.

Prior to embodiments of the disclosed invention, a liquid storage tank was used to hold water, or a proppant, when a well was being fractured. The material was held in a liquid storage tank and connected by a hose or pipeline to a pump that would move the liquid down the wellbore at a high pressure to push open the formation and the proppant was used to keep the formation open.

As a result, these tanks would need to be blown down from time to time. That is, excess pressure would need to be bled out of the fluid collection tank. However, there was no system to filter the mist that was released from the liquid collection tank. Embodiments of the disclosed invention solve that problem. Some other endeavors in this field include: U.S. Pat. No. 3,538,686 issued to Schwab; U.S. Pat. No. 4,304,579 issued to Granville; and U.S. Pat. No. 4,545,833 issued to Tafara. The references teach a single filter bag attached to a flange and not a double filter bag. Similarly, the adaptability to many kinds of pins is not taught.

SUMMARY

A filter system is configured to filter a particulate matter from air blown from a liquid storage tank having a manway neck. The filter system includes a filter bag, configured to filter the particulate matter from the air. A flange plate is operatively connected to the filter bag and the manway neck. The air blown from the liquid storage tank through the manway neck is filtered by the filter bag.

In some embodiments, the filter bag can further comprise an inner filter bag further comprising a retainer ring. An outer filter bag can be joined to the inner filter bag with a skirt seam creating an outer filter bag lower pocket. An inner filter bag top seam and an inner filter bag rear seam can be arranged on the inner filter bag. An outer filter bag top seam and an outer filter bag rear seam can be arranged on the outer filter bag.

In some embodiments, the flange plate can further comprise: a first bolt slot, adapted to receive a first manway bolt. A second bolt slot can be adapted to receive a second manway bolt. A third bolt slot can be adapted to receive a third manway bolt. A fourth bolt slot can be adapted to receive a fourth manway bolt. A fifth bolt slot can be adapted to receive a fifth manway bolt. The first bolt slot can be bisected by a center line. The second bolt slot can be approximately 60-72 degrees from the center line.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
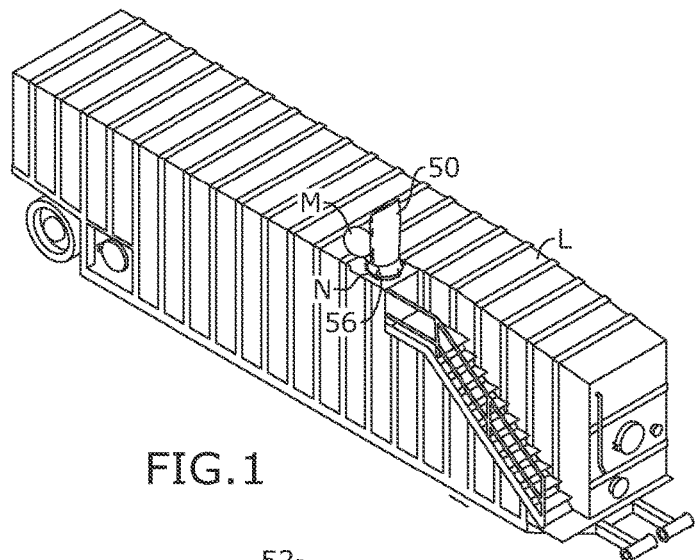
FIG. 1 shows a perspective view of one embodiment of the present invention.
Figure 2:
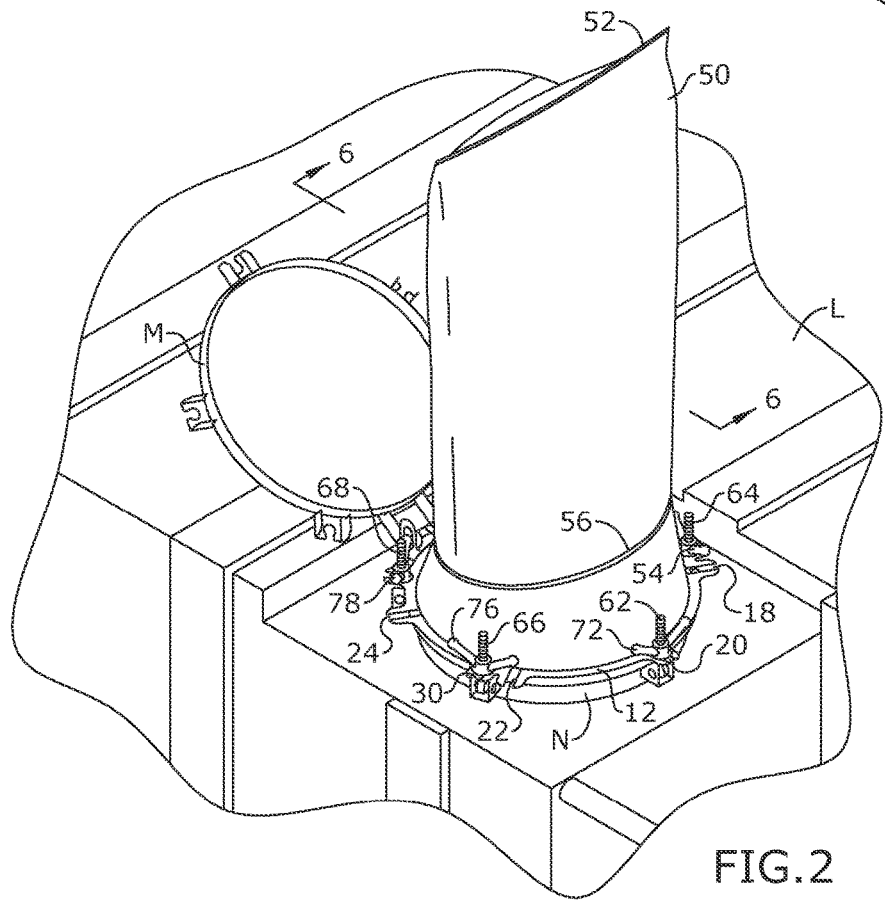
FIG. 2 shows a detail perspective view of one embodiment of the present invention.

By way of example, and referring to FIG. 1, liquid storage tank L is mechanically coupled to five-point manway neck N, which can be covered with manway lid M. However when blowing down liquid storage tank L it is more preferable to use filter system 10 attached to manway lid M.

Figure 3:
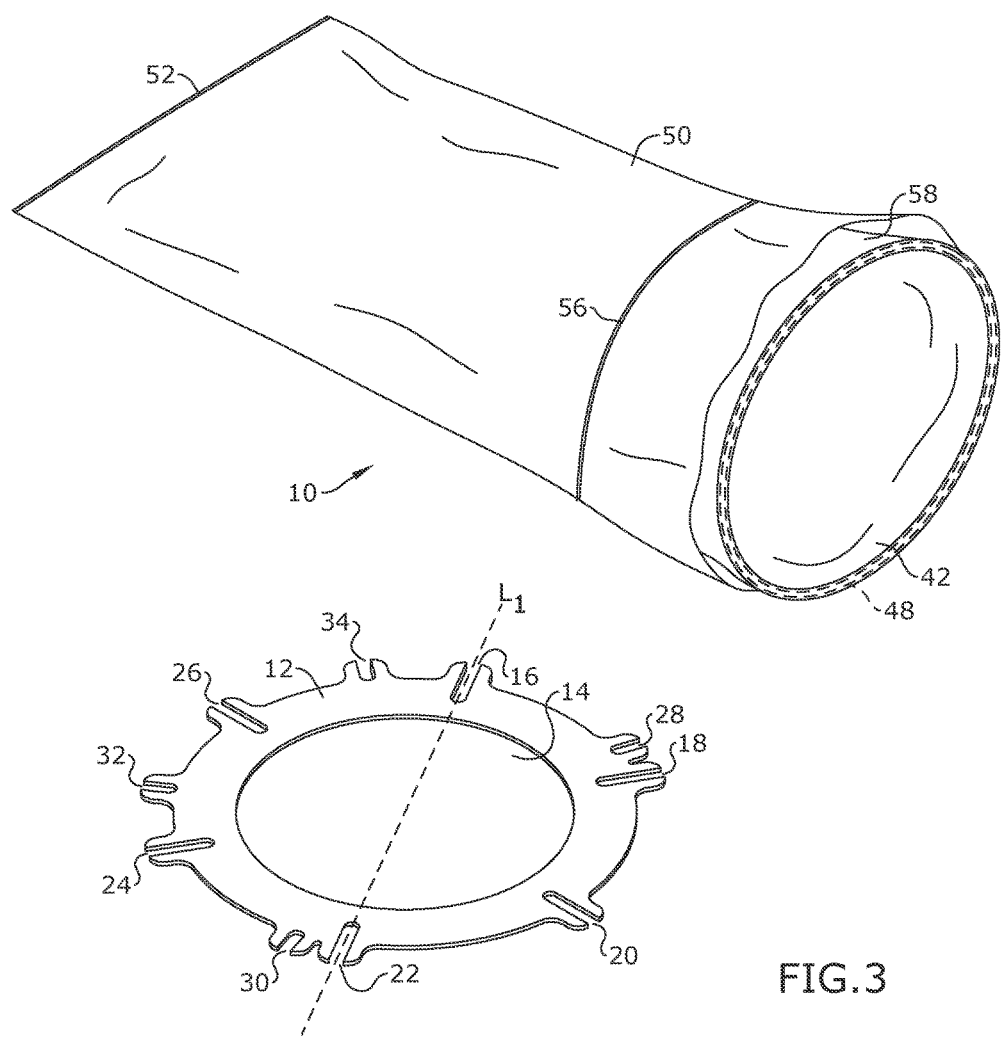
FIG. 3 shows a perspective view of one embodiment of the present invention.

As shown in FIG. 3, filter system 10 further comprises flange plate 12 attached to filter bag assembly 40. Flange plate 12 further comprises inner ring 14. Flange plate 12 further comprises a plurality of bolt slots, those bolt slots are referred to by their angular relationship to center line L1.

Center line L1 intersects first six-point bolt slot 16. Approximately 60 degrees clockwise from first six-point bolt slot 16 is second six-point bolt slot 18. Approximately 120 degrees clockwise from first six-point bolt slot 16 is five-point and six-point bolt slot 20 which could properly be considered both a third six-point bolt slot and a first five-point bolt slot. Approximately 180 degrees clockwise from first six-point bolt slot 16 is fourth six-point bolt slot 22. Approximately 240 degrees clockwise from first six-point bolt slot 16 is fifth six-point bolt slot 24. Approximately 300 degrees clockwise from first six-point bolt slot 16 is sixth six-point bolt slot 26.

Approximately 48 degrees clockwise from first six-point bolt slot 16 is second five-point bolt slot 28. Approximately 192 degrees clockwise from first six-point bolt slot 16 is third five-point bolt slot 30. Approximately 264 degrees clockwise from first six-point bolt slot 16 is fourth five-point bolt slot 32. Approximately 336 degrees clockwise from first six-point bolt slot 16 is fifth five-point bolt slot 34.

Figure 5:
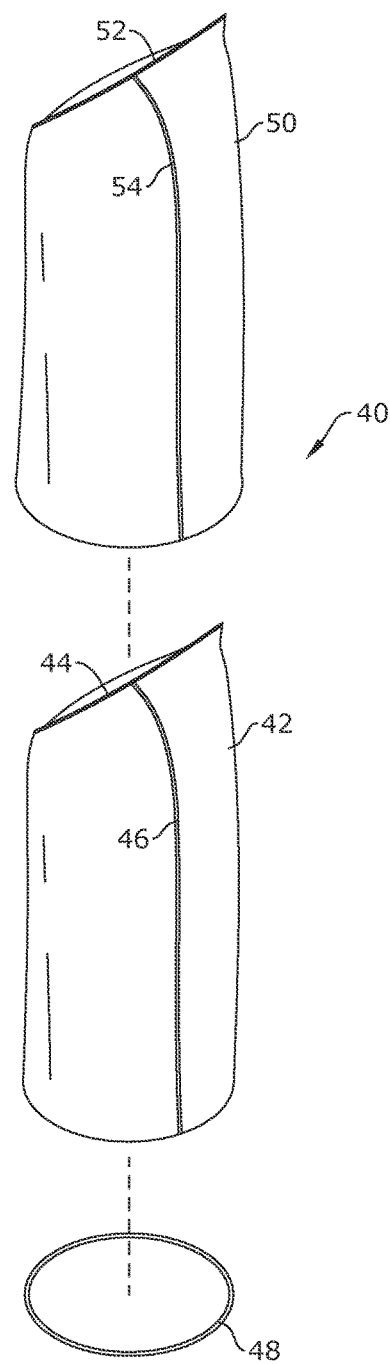
FIG. 5 shows a rear exploded view of one embodiment of the present invention.

As shown in FIG. 3 and FIG. 5, filter bag assembly 40 further comprises inner filter bag 42 further comprising inner filter bag top seam 44 and inner filter bag rear seam 46. Inner filter bag 42 is operably coupled to retainer ring 48. Inner filter bag 42 is then covered with outer filter bag 50. Outer filter bag 50 further comprises outer filter bag top seam 52 and outer filter bag rear seam 54. Outer filter bag 50 is attached to inner filter bad 42 with skirt seam 56. This creates outer filter bag lower pocket 58.

Figure 4:
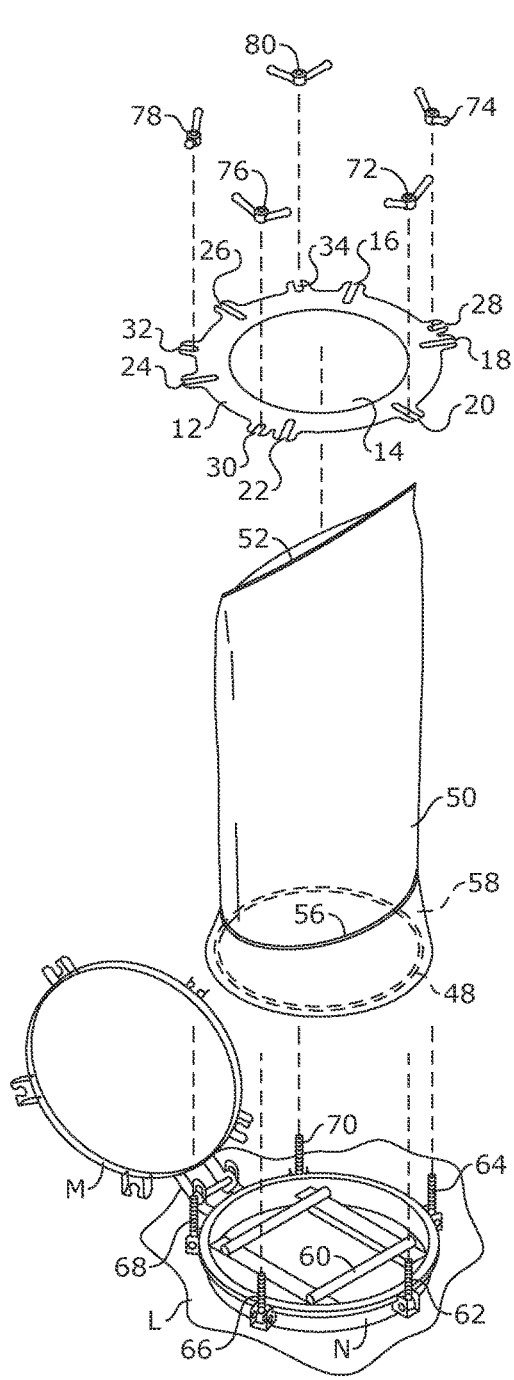
FIG. 4 shows an exploded view of one embodiment of the present invention.
Figure 6:
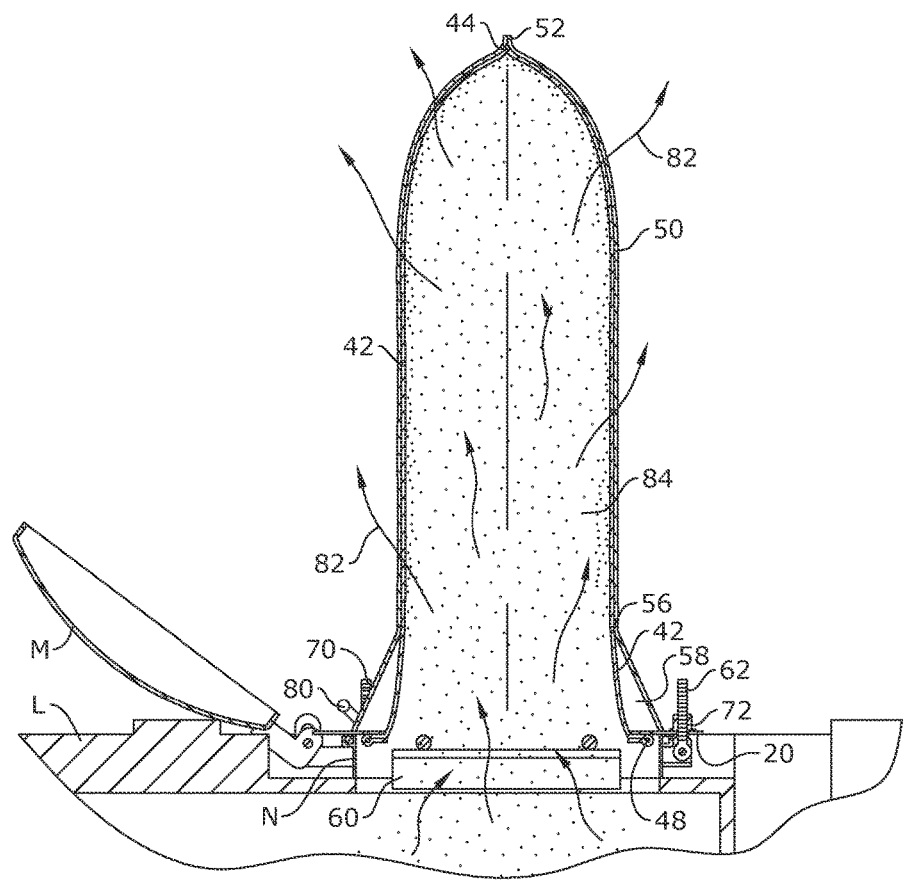
FIG. 6 shows a section view of one embodiment of the present invention taken along line 6-6 in FIG. 2.
Figure 7:
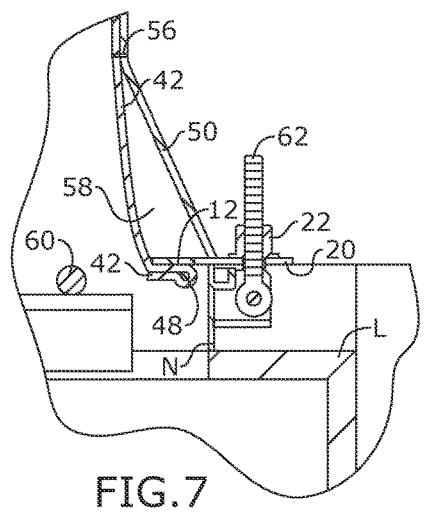
FIG. 7 shows a detail view of one embodiment of the present invention.

Turning to FIG. 4, FIG. 6 and FIG. 7, flange plate 12 has a smaller inner diameter than retainer ring 48. To assemble the device, flange plate 12 needs to be placed over filter bag assembly 40 and thus upon retainer ring 48. Inside, five-point manway neck N a user can insert safety bracket 60. Safety bracket 60 prevents filter system 10 from falling into liquid storage tank L.

Five-point manway neck N is rotatably attached to first manway bolt 62, second manway bolt 64, third manway bolt 66, fourth manway bolt 68 and fifth manway bolt 70. To attach filter system 10 to five-point manway neck N, first manway bolt 62 is inserted into five-point and six-point bolt slot 20 and clamped down with first manway nut 72. Then, second manway bolt 64 is inserted into second five-point bolt slot 28 and clamped down with second manway nut 74.

After that, third manway bolt 66 is inserted into third five-point bolt slot 30 and clamped down with third manway nut 76. Following that, fourth manway bolt 68 is inserted into fourth five-point bolt slot 32 and clamped down with fourth manway nut 78. Finally, fifth manway bolt 70 is inserted into fifth five-point bolt slot 34 and clamped down with fifth manway nut 80.

As shown in FIG. 7, a discharge mist comprises air 82 and particulate matter 84. When the discharge mist passes through filter system 10, the air is permitted to pass, while the particulate matter is filtered out.

Figure 8:
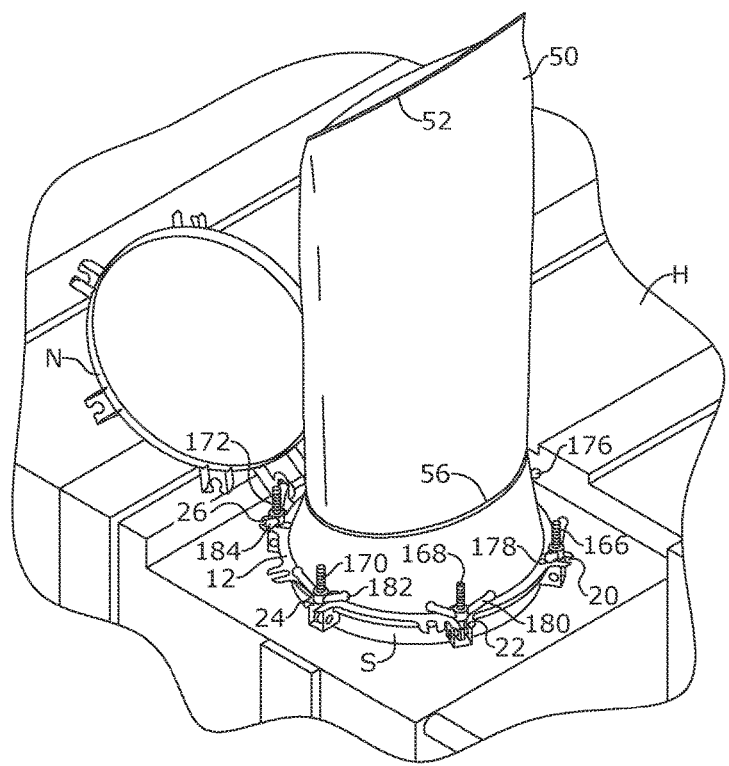
FIG. 8 shows a perspective view of one embodiment of the present invention.
Figure 9:
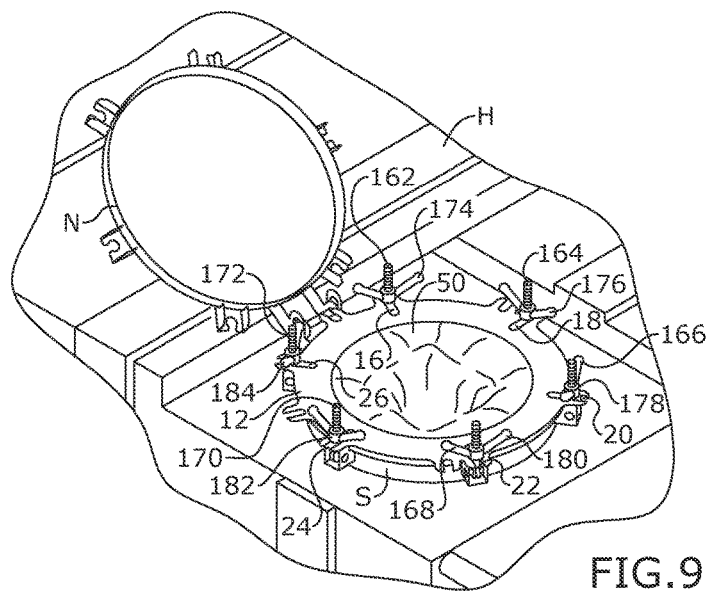
FIG. 9 shows a perspective view of one embodiment of the present invention.

Turning to FIG. 8 and FIG. 9, the versatility of the present invention is shown by use in both five point and six point manway necks. Here, fluid storage tank H is attached to six-point manway neck S. Six-point manway neck S is normally covered by manway lid N, but it is shown here with filter system 10.

Here, six-point manway neck S is rotatably attached to first manway bolt 162, second manway bolt 164, third manway bolt 166, fourth manway bolt 168, fifth manway bolt 170, and sixth manway bolt 172. To attach filter system 10 to six-point manway neck S, first manway bolt 162 is inserted into first six-point bolt slot 16 and clamped down with first manway nut 174. Then, second manway bolt 164 is inserted into second six-point bolt slot 18 and clamped down with second manway nut 176. After that, third manway bolt 166 is inserted into five-point and six-point bolt slot 20 and clamped down with third manway nut 178. Following that, fourth manway bolt 168 is inserted into fourth six-point bolt slot 22 and clamped down with fourth manway nut 180. Next, fifth manway bolt 170 is inserted into fifth six-point bolt slot 24 and clamped down with fifth manway nut 182. Finally, sixth manway bolt 172 is inserted into sixth six-point bolt slot 26 and clamped down with sixth manway nut 184.

The "first bolt slot" refers to one member of the set consisting of first six-point bolt slot 16 and five-point and six-point bolt slot 20. The "second bolt slot" refers to one member of the set consisting of second six-point bolt slot 18 and second five-point bolt slot 28. The "third bolt slot" refers to one member of the set consisting of five-point and six-point bolt slot 20 and third five-point bolt slot 30. The "fourth bolt slot" refers to one member of the set consisting of fourth six-point bolt slot 22 and fourth five-point bolt slot 32. The "fifth bolt slot" refers to one member of the set consisting of fifth six-point bolt slot 24 and fifth five-point bolt slot 34.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, ¶6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A filter system, configured to filter a particulate matter from air blown from a liquid storage tank having a manway neck, the filter system comprising:
   a filter bag, configured to filter the particulate matter from the air;
   a flange plate, operatively connected to the filter bag and the manway neck; the flange plate further comprising:
   a first open ended six-point bolt slot, adapted to receive a first manway bolt; wherein a centerline bisects the first open ended six-point bolt slot
   a second open ended six-point bolt slot bolt slot, adapted to receive a second manway bolt; wherein the second open ended six-point bolt slot is located approximately 60 degrees clockwise from first six-point bolt slot;
   a third open ended six-point bolt slot bolt slot, adapted to receive a third manway bolt; wherein the third open ended six-point bolt slot is located approximately 120 degrees clockwise from first six-point bolt slot; wherein the third open ended six-point bolt slot further operates as a first five-point bolt slot;
   a fourth six-point bolt slot open ended bolt slot, adapted to receive a fourth manway bolt; wherein the fourth open ended six-point bolt slot is located approximately 180 degrees clockwise from first six-point bolt slot and is thus also bisected by the centerline;
   a fifth six-point bolt slot open ended bolt slot, adapted to receive a fifth manway bolt; wherein the fifth open ended six-point bolt slot is located approximately 240 degrees clockwise from first six-point bolt slot;
   a sixth six-point bolt slot open ended bolt slot, adapted to receive a sixth manway bolt; wherein the fifth open ended six-point bolt slot is located approximately 300 degrees clockwise from first six-point bolt slot;
   a second open ended five-point bolt slot; arranged approximately 48 degrees clockwise from first six-point bolt slot;
   a third open ended five-point bolt slot; arranged approximately 192 degrees clockwise from first six-point bolt slot;
   a fourth open ended five-point bolt slot; arranged approximately 264 degrees clockwise from first six-point bolt slot;

a fifth open ended five-point bolt slot; arranged approximately 336 degrees clockwise from first six-point bolt slot;

wherein the air blown from the liquid storage tank through the manway neck is filtered by the filter bag.

2. The filter system of claim 1, wherein the filter bag further comprises:

an inner filter bag further comprising a retainer ring; and an outer filter bag joined to the inner filter bag with a skirt seam creating an outer filter bag lower pocket.

3. The filter system of claim 2, further comprising:

an inner filter bag top seam and an inner filter bag rear seam arranged on the inner filter bag; and an outer filter bag top seam and an outer filter bag rear seam arranged on the outer filter bag.

* * * * *